United States Patent [19]

Spitzberg

[11] Patent Number: 5,028,127
[45] Date of Patent: Jul. 2, 1991

[54] WAFER THIN READING TELESCOPE

[76] Inventor: Larry A. Spitzberg, 10711 Atwell, Houston, Tex. 77096

[21] Appl. No.: 393,654

[22] Filed: Aug. 14, 1989

[51] Int. Cl.$^5$ .............................................. G02C 1/00
[52] U.S. Cl. ..................... 351/158; 351/57; 350/145
[58] Field of Search .............. 351/57, 158, 70, 75; 350/145, 146

[56] References Cited

U.S. PATENT DOCUMENTS

| | | | |
|---|---|---|---|
| 1,610,553 | 12/1926 | Jones . | |
| 2,058,676 | 10/1936 | Foster . | |
| 2,710,560 | 6/1955 | Thompson . | |
| 3,228,696 | 1/1966 | Hull . | |
| 3,619,040 | 11/1971 | Rickets | 350/286 |
| 4,173,394 | 11/1979 | Clave et al. | 350/181 |
| 4,195,918 | 4/1980 | Freche et al. | 128/380 |
| 4,704,000 | 11/1987 | Pekar et al. | 350/145 |
| 4,720,178 | 1/1988 | Nishioka | 350/401 |
| 4,795,235 | 1/1989 | Spitzberg | 350/145 |

FOREIGN PATENT DOCUMENTS 622107 4/1949 European Pat. Off. .

OTHER PUBLICATIONS

Kollmorgen Optical Corporation, Spectel; Aids to Sub-Normal Vision.
Optical Designs, Inc., Behind-the-Lens Telescope, Oct. 1988 Houston, Texas.
Edwards Optical Corporation, BITA Low Vision Enhancer, Virginia Beach, Virginia (date unknown).

*Primary Examiner*—Paul M. Dzierzynski
*Attorney, Agent, or Firm*—Arnold, White & Durkee

[57] ABSTRACT

A wafer thin reading telescope utilizing a unique parallelogram shaped prism, together with plus and minus lenses comprises a Galilean reading telescope. The telescope is mounted in the bifocal region of an eyeglasses lens at an approximately 22½ degree downward angle relative to the straight ahead gaze. The reading telescope is sufficiently small and light weight in nature so as to be mountable to the back surface of the carrier lens by the use of adhesive. The eyepiece and objective lenses are truncated vertically to provide a wide horizontal field of view relative to the vertical field of view. The telescope is capable of magnifying objects to a power of about 2.5× to about 4× and is focusable by moving the image or alternatively by reciprocating the eyepiece lens within a threaded collar. The telescope can be enclosed within a housing.

19 Claims, 3 Drawing Sheets

WAFER THIN READING TELESCOPE

BACKGROUND OF THE INVENTION

1. Field of the Invention

The present invention relates to an apparatus for magnifying an image. More particularly, the present invention relates to a behind-the-lens, wafer thin reading telescope for use with spectacles or eyeglasses, the telescope having a relatively long optical path through the optical system while at the same time having a relatively short dimension from front to back. This wafer thin reading telescope aids partially sighted patients or users especially in the reading of print.

2. Description of the Prior Art

A large of number of people have impaired vision that cannot be corrected with spectacles. As reported in *Vision Research—A National Plan* 1983-1987: *The 1983 Report of the National Advisory Eye Council*, "[a]n estimated ten million Americans have irreversibly impaired vision. About 1.5 million Americans are unable to read ordinary newsprint, even with the best possible optical correction, and five hundred thousand people are classified as legally blind." These legally blind people have a visual acuity of about 20/200 or worse. The visual acuity of the other low vision people is not correctable to better than 20/50 with single lens systems such as conventional eyeglasses or contact lenses, and correction to a range of 20/100 is more typical. This range of correction leaves the person with great difficulty in reading signs, distinguishing the shapes of objects and reading print.

These partially sighted people, and especially the elderly among them, want to be able to read. In a recent survey of low vision patients, two-thirds of them stated that reading was the number one task that they wanted to achieve.

The most common optical aids to help in reading are spectacle magnifiers, stand and hand magnifiers, and reading telescopes. The large disadvantage with spectacle magnifiers is the close working distance. A plus 12 diopter microscopic glass spectacle magnifier magnifies 3 times, but has only a three inch working distance. This distance is much too close for reading comfort for many patients. Stand and hand magnifiers give a larger working distance but a smaller field of view and do not allow the user's hands to be free.

The other common optical aid is the reading telescope. Conventional reading telescopes have the disadvantage of a smaller field of view than spectacle magnifiers and very poor cosmetic appearance. However, they do offer a more normal working distance such as 12 inches. Reading telescopes small enough to be attached to the lens of a pair of eyeglasses have been known in the art for many years. Most such devices suffer the disadvantage that they are secured to the eyeglasses lens by extending through a hole drilled through the lens and extend forward from the eyeglasses lens for a distance of up to four inches. Most of these devices are heavy and are immediately noticed by others so as to be cosmetically undesirable. Currently available bioptic telescopes are either Galilean or Keplerian telescopes that are generally cylindrical in form and have both objective and eyepiece lenses oriented along the axis of a cylinder. These telescopes range in size from about 1 to about 4 inches in length and have magnifying powers ranging from about 2× to about 8×.

Many types of bioptic telescopes are known in the art and are prescribed on an individual basis for a patient depending on the patient's specific needs. Bioptic telescope systems are prescribed for patients desiring increased visual acuity for reading or close work. Monocular telescope systems can be prescribed for patients having reduced vision in one eye only or for a patient having vision in only one eye.

Typically, these bioptic telescopes are mounted to eyeglasses by boring a hole of appropriate size through the carrier lens, either immediately above or below the normal line of sight, and securing the telescope in the hole. Both head and eye movements are required to use a bioptic telescope conventionally mounted in an eyeglasses lens. For example, if a telescope is mounted above the line of sight, the patient first rotates the head downward to direct the telescope at the object the patient wishes to see, and then the patient rotates the eyes upward by a corresponding amount to bring the visual axis of the eye into coincidence with the optical axis of the telescope. Many more reading telescopes could be prescribed if patients did not reject them because of their appearance, weight, cost and inconvenience.

Other types of telescope systems have been devised with the purpose of reducing their weight and unwieldy size and to reduce the forward protrusion in front of the carrier lens. Examples of these types of systems include the Galilean BITA lens manufactured by the Edwards Optical Corporation of Virginia Beach, Va. This cylindrical telescope system is mounted through and behind the eyeglasses lens directly in front of the eye of the wearer. Although this system provides desired magnification, because it is miniaturized and because it is Galilean, the lens of the system must be mounted very close to the patient's eye in order to provide a good field of view. This creates the potential for eye injury. In addition, when the patient blinks, eyelashes invariably brush over the lenses.

Another telescopic lens system available in the prior art is a "bioptic periscope" invented by the inventor of the present invention and the subject of U.S. Pat. No. 4,795,235 issued Jan. 3, 1989 (the '235 patent). The invention in the '235 patent involves the use of a roof prism which enables the bioptic apparatus to be mounted entirely behind an eyeglasses lens being laterally displaced from a patient's straight ahead gaze. The apparatus is flush mounted within a hole formed in the carrier lens such that there is no forward protrusion from the front surface of the carrier lens. The apparatus is placed at an approximately 36-degree viewing angle relative to the straight ahead gaze. To utilize the bioptic periscope, the patient is required to rotate the eyes temporally in order to bring the pupil into axial alignment with the eyepiece lens of the bioptic periscope.

By having the bioptic periscope displaced from the normal straight ahead gaze, the blind area or "blind spot" created in the peripheral field surrounding prior art bioptic apparatus is eliminated or reduced. In addition, because the apparatus is laterally displaced at a point off the visual axis, the danger present by having the eye of the patient in close proximity to the apparatus is greatly reduced or eliminated. The bioptic periscope of the '235 patent is a Keplerian telescope. In other words, the apparatus utilizes plus lenses as the objective lens and the eyepiece lens. By having two plus lenses, a greater degree of magnification can be achieved.

In the invention of the '235 patent, light reflected from an image passes through an objective lens and through an apex face of the roof prism. The light traverses the prism and is internally reflected from another apex face of the roof prism. The light traverses the prism a second time and is reflected from the roof of the prism. The roof reflects the light back to the first apex face where the light is reflected a third time causing the light to traverse the roof prism a fourth time. The light is then transmitted through the roof prism face and through the eyepiece lens where it is received within the patient's pupil. Wedge prisms can be mounted within the apparatus between the apex faces of the roof prism and the eyepiece lens to provide additional bending of light to bring it more precisely into coincidence with the visual axis of the patient's eye. In this apparatus, the light traverses the roof prism four times. These traverses increase the focal length of the bioptic periscope sufficiently to allow magnification of an image in a range from about 3× to about 6× depending on the powers of the objective and eyepiece lenses used.

The focal length of the bioptic periscope of the '235 patent is in the range of about 1 foot to infinity. This vision aid can be used for reading, but only for short periods of time as the eye would get tired using the 36 degree eye rotation for prolonged reading. This vision aid is only used monocularly. Though this vision aid is compact, it is a Keplerian system and requires a roof prism which increases its size. Therefore, this vision aid is entirely unsuitable for normal, prolonged reading conditions.

SUMMARY OF THE INVENTION

The present invention utilizes a unique prism in combination with a plus and a minus lens to form a Galilean reading telescope. Due to its lightweight and compact nature, its extreme thinness and non-cylindrical form and because of the unique prism, the reading telescope can be mounted entirely behind the carrier lens of a patient's spectacles by the use of a suitable adhesive. This obviates the need for any holes to be drilled in the carrier lens except in situations where the carrier lens is of an exceptionally strong prescription and is therefore relatively thick in the area where the reading telescope is mounted. Because adhesive is used to secure the reading telescope to the eyeglasses lens rather than permanent holes, it is easily movable to meet particular requirements of the patient.

The reading telescope of the subject invention is mounted in the bifocal region of the carrier lens at a convenient downward viewing angle of approximately 22½ degrees. This positioning is determined in much the same manner as determining the positioning of a bifocal region with respect to the patient's pupil. As with bifocals, the telescope can be mounted binocularly, one in front of each eye of the patient.

Because of its small and lightweight nature and because it is mounted entirely behind the eyeglasses lens, the reading telescope is more aesthetically pleasing than reading devices of the prior art. It also allows for a normal reading posture with the telescope adhesively mounted in the bifocal region of the wearer's glasses. The size and position of the assembly renders the telescope eyepiece lens less susceptible to impacting a patient's eye. Its lightweight and movable nature makes the telescope much easier to fit to a patient's spectacles than previous reading telescopes.

The reading telescope has a working distance or focal length of about 12-16 inches and a power range of about 2.5× to 3.5×. It comprises an objective lens, an eyepiece lens and a frusto parallelogram prism. Light from a near object is transmitted through the objective lens to the reflecting prism. There it is reflected upward through the prism by four reflections, two by mirrored surfaces and two by total internal reflection. The light then passes out and through the eyepiece lens to the observer's eye. Both the eyepiece lens and the objective lens can be vertically truncated to provide a wide horizontal field of vision relative to the vertical field of vision.

Two of the angled surfaces of the prism are mirrored to provide complete image reflection and to eliminate diffused light reflections. This arrangement provides an improved quality of reflected image. In addition, the mirrored surfaces cooperate with the surfaces providing total internal reflection to provide the necessary optical separation of the telescope lenses.

DETAILED DESCRIPTION OF THE DRAWINGS

Figure 1:
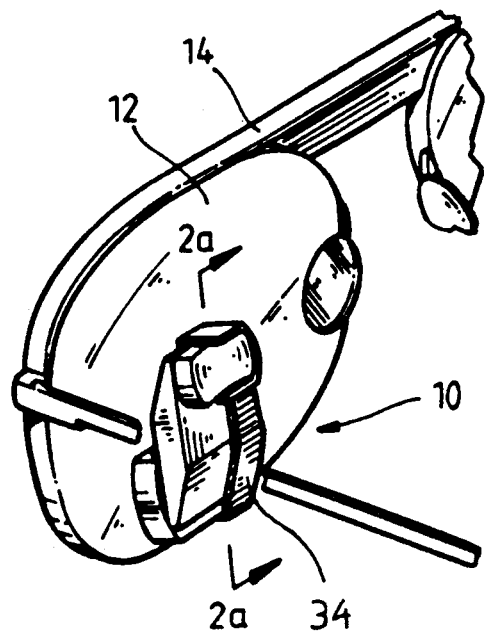
FIG. 1 is a perspective view of the apparatus of the present invention shown mounted on the lens of a pair of eyeglasses. A prism housing is shown in a partial cut-away view.
Figure 2A:
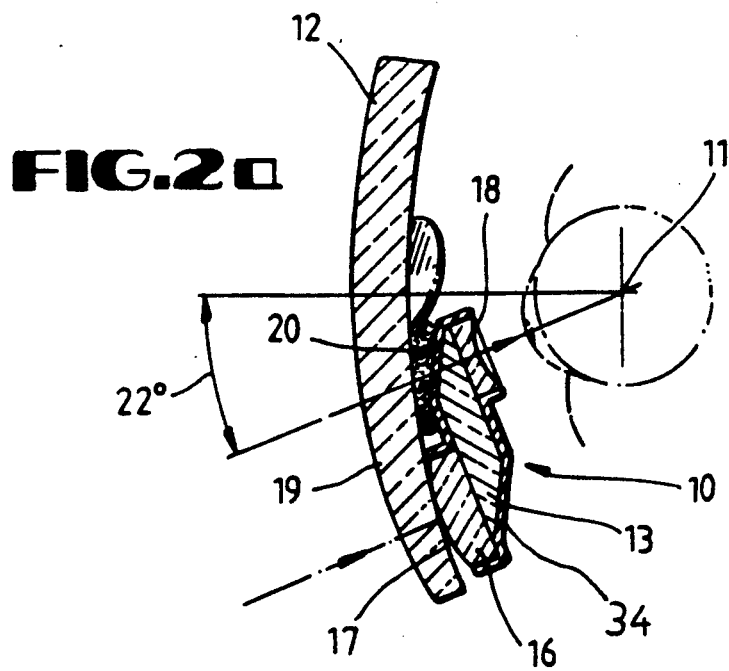
FIG. 2a is a side view of the apparatus mounted on the carrier lens at an approximately 22½ degree downward viewing angle relative to the straight ahead gaze.
Figure 2B:
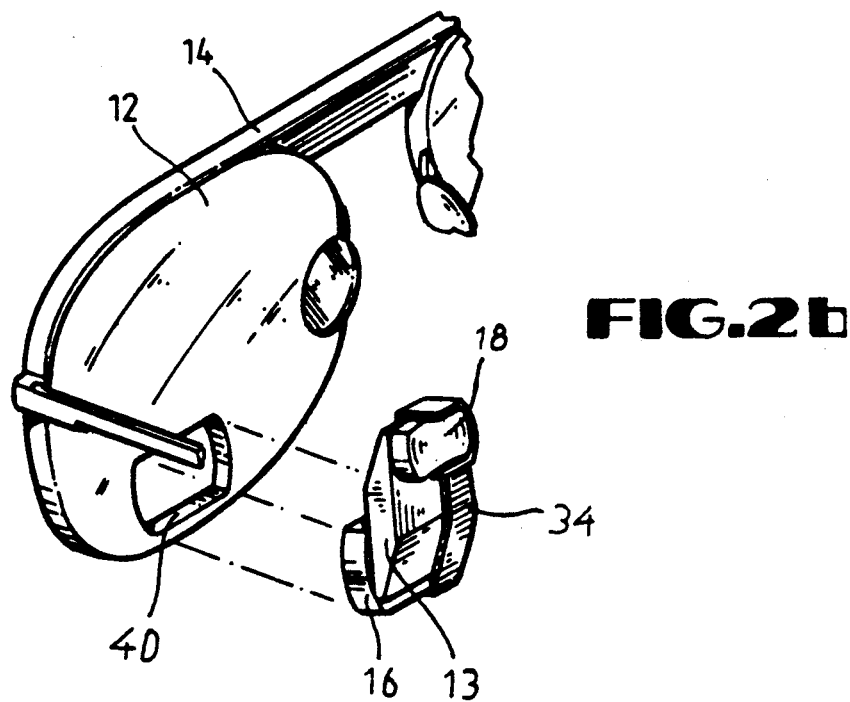
FIG. 2b is a perspective view of the apparatus of the present invention shown mounted in the lens of a pair of eyeglasses having a mounting hole. A prism housing is shown in a partial cut-away view.

As shown in FIGS. 1 and 2a, a reading telescope 10 according to the apparatus of the present invention is mounted in a bifocal region 19 of a carrier lens 12 of a pair of spectacles 14. In a preferred embodiment, the reading telescope 10 is mounted on the carrier lens 12 at a downward viewing angle of about 22½ degrees relative to the patient's straight ahead gaze. As shown in FIGS. 2a and 2b, the vertex 11 of this angle is about 13 mm behind the cornea of the eye, placing the vertex in the approximate center of the eyeball. This angle is coincident with the eyepiece lens being in the bifocal region of the carrier lens. In alternative embodiments of the present invention, viewing angles between about 17 degrees and about 27 degrees are obtainable by varying the angles of the prism or the index of the glass in a manner well known to those skilled in the art to keep total internal reflection at the two non-mirrored reflective faces.

As is also shown in FIGS. 2a and 2b, an objective lens 16 on the outward side 17 of the reading telescope rests against the carrier lens 12. A carrier lens which has a very strong prescription necessarily has a higher degree of curvature within the lens and a correspondingly greater thickness at the lower bifocal region 19 of the carrier lens. In this circumstance, it is contemplated that a hole 40 could be drilled in the carrier lens 12 to accommodate the objective lens 16 of the reading telescope.

Figure 3:
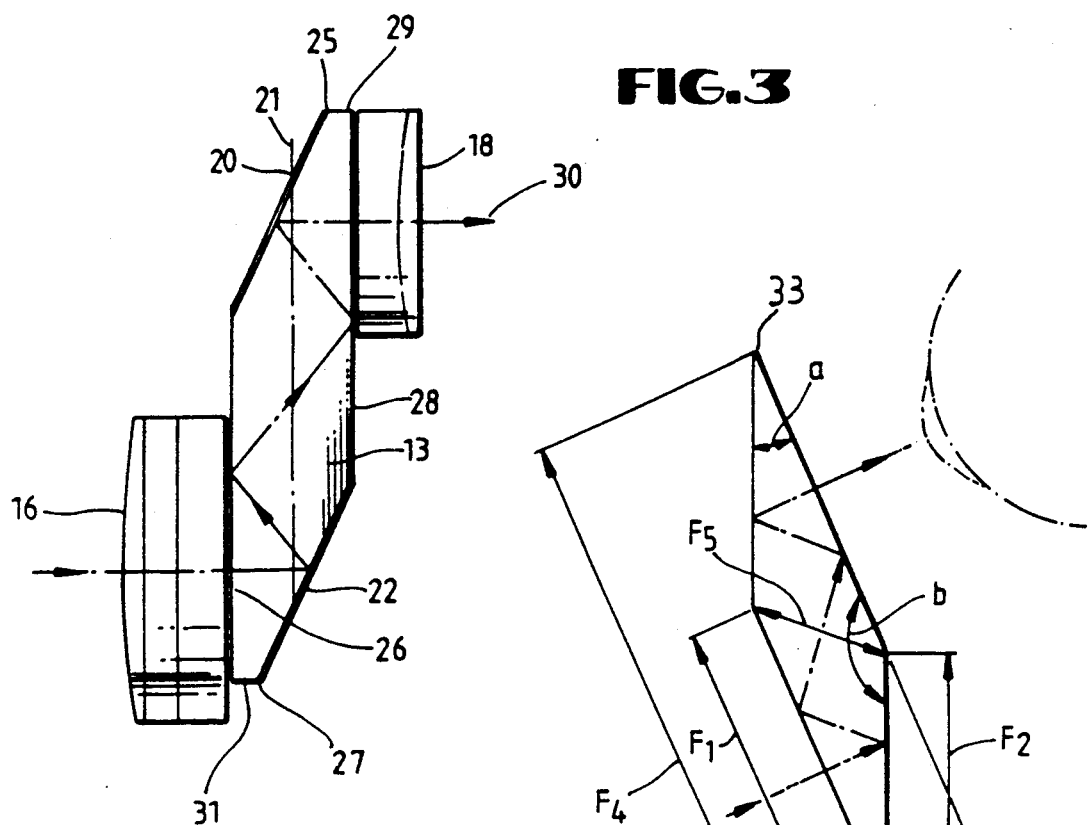
FIG. 3 shows a side view of the reading telescope of the present invention and illustrates in schematic form the path of light as it is reflected from an object and transmitted through the objective lens, upward by four internal reflections through the prism and out through the eyepiece lens to the observer's eye.

It can be seen from the figures, more especially from FIG. 3, that a prism 13 is provided in the shape of a frusto parallelogram. The prism has four reflecting faces, two of which are parallel with the other two faces. Two of the parallel reflecting faces, faces 20 and 22, are angled with respect to the vertical axis 21 of the prism. The vertically aligned parallel faces of the prism are denoted 26 and 28. The upper and lower truncated faces of the prism are denoted 29 and 31 respectively.

Figure 4:
FIG. 4 is a perspective view of the objective lens, prism and eyepiece lens with height, width and depth dimensions.

In a preferred embodiment of the present invention at a 22½ degree viewing angle, the angles and prism dimensions are shown in FIG. 4. These angles of 22½ degrees for the internal acute angles, denoted "a" in FIG. 4, and 157½ degrees for the obtuse angles of the parallelogram prism, denoted "b" in FIG. 4, completely specify the non-truncated prism once a side or thickness dimension is specified and can be determined by the use of well known trigonometric functions. With a thickness dimension of f5(see FIG. 4), the side dimensions are:

$$f1 = 2.414 \times f5$$

$$f2 = 1.848 \times f5$$

The "box" width and "box" length dimensions of the prism are:

$$f3 = 0.7071 \times f5$$

$$f4 = 4.1212 \times f5$$

The front to back thickness of the reading telescope can be defined in terms of a ratio. As shown in FIGS. 3 and 4, the distance between the two vertical faces 26 and 28 is denoted f3. The vertical distance between the upper and lower apexes 33 and 35 of the prism is denoted f4. The ratio of f4 to f3 is 5.83 in a preferred embodiment and is about 4 after truncation. It can be easily seen that the overall dimensions of the prism can be varied while at the same time keeping the ratios the same for any embodiment. Notwithstanding the uniformity of the ratios in alternative embodiments of the present invention, the dimensions of the prism need to be small enough in order to provide adequate room to fit the prism entirely behind the carrier lens 12. In a preferred embodiment, the height f4 is approximately 1 inch after truncation, which is the approximate height of a bifocal region. The thickness f3 is about ¼ inch. The thickness of the prism close to the patient's eye is even thinner than this.

Face 26 of prism 13 is outward facing and face 28 is inward facing. The upper, outward facing face 20 of prism 13 can be coated with adhesive material to enable the apparatus to be adhesively secured to the carrier lens 12. It is also contemplated in alternative embodiments of the invention that a housing 34 will be provided to enclose the prism portion of the reading telescope. The adhesive in this instance would be applied to the housing itself which would then be adhesively secured to the carrier lens as shown in FIG. 1.

In a presently preferred embodiment, faces 20 and 22 are mirrored 25 and 27 to provide complete reflection and to substantially eliminate diffused light reflections as previously described. Because of the angle at which the incident light impacts the internal faces 26 and 28 of the prism, reflection from these faces is achieved by total internal reflection. Therefore, as shown in FIG. 3, the light passes through the objective lens and is reflected by the mirrored surface 22 to an internal face 26. It is then reflected by total internal reflection to internal face 28 where it is again reflected by total internal reflection to mirrored face 20 where it is reflected out through the eyepiece lens 18. When the patient's eye is rotated so that the visual axis coincides with the optical axis shown at arrow 30 of FIG. 3, the incident light received through the objective lens 16 of the reading telescope is received within the patient's pupil. Thin baffles, not shown, between the lenses and the prism provide an air space so that the optical elements are not in optical contact.

As can be seen from FIGS. 2a and 2b, mounting the telescope in the bifocal region of the carrier lens renders less obstructive the "blind spot" present in the peripheral visual field surrounding apparatus in the prior art. By having the telescope mounted in that bifocal region, the patient is able to wear the spectacles on a continual basis utilizing the carrier lens to increase normal viewing acuity and rotating the eyes downward at 22½ degrees in order to bring the pupil into coincidence with the reflected image from the eyepiece of the reading telescope. Because of this angle of rotation and the thin prism, the eyelashes of most patients do not touch eyepiece 18. This enables the reading telescope to be worn comfortably when mounted to a variety of different eyeglasses frames 14.

Focusing the reading telescope is done by moving the object, for example, a book or other print which the patient is reading, to a distance closer to or further from the objective lens of the reading telescope. Myopes bring the print closer, hyperopes bring the print further away to clear the print. For most applications, this movement is within a range of 12 to 16 inches. Thus, the patient can conveniently maintain an image in focus by the simple expedient of moving the image toward or away from the telescope. It is also contemplated in an alternative embodiment that the eyepiece 18 be mounted within a collar having a threaded portion. The threaded collar can be rotated in one direction or another, reciprocating the eyepiece lens within the threaded collar, for expanding the focusing range without the need for moving the image. This type of focusing apparatus is known to those in the art and is essentially set forth in the '235 patent.

The field of view of the reading telescope is approximately 10 degrees in the horizontal direction and 5 degrees in the vertical direction. Wider degrees of vision can be obtained with different combinations of objective and eyepiece lenses. In a preferred embodiment of the present invention, the objective lens has a 22 millimeter diameter and has a 33 millimeter focal length.

The eyepiece lens has a negative 13 millimeter focal length and a 10 millimeter diameter. The present invention contemplates the use of lenses with different diameters and focal lengths to suit the different requirements of each patient. These different arrangements can result in variations in the field of vision.

Figure 5:
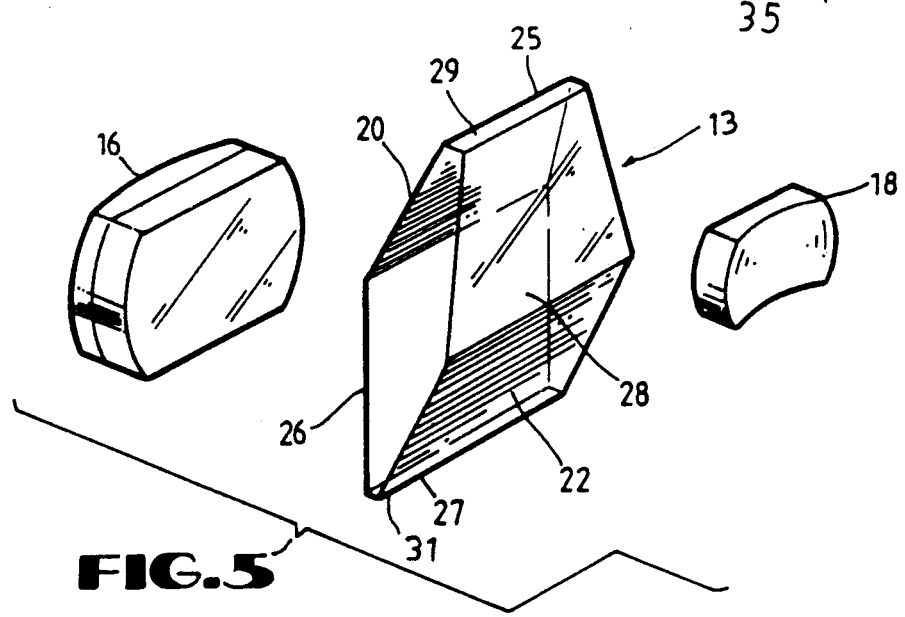
FIG. 5 is a perspective view of the apparatus wherein the objective lens and eyepiece lens are truncated vertically, and wherein the upper portion of the prism is tapered to fit within a housing.

As shown in FIG. 5, the present invention also contemplates that the objective and the eyepiece lens be truncated vertically to provide a wide horizontal field of vision relative to the vertical field of vision. In a preferred embodiment of the invention, the objective lens 16 and eyepiece lens 18 are truncated vertically in such a manner to make the top of eyepiece lens 18 and the bottom of objective lens 16 almost flush with the truncated edges 29 and 31 respectively of the frusto parallelogram prism 13. The amount of truncation of the objective and eyepiece lenses will vary considerably in alternative embodiments depending on prevailing design considerations.

Figure 6:
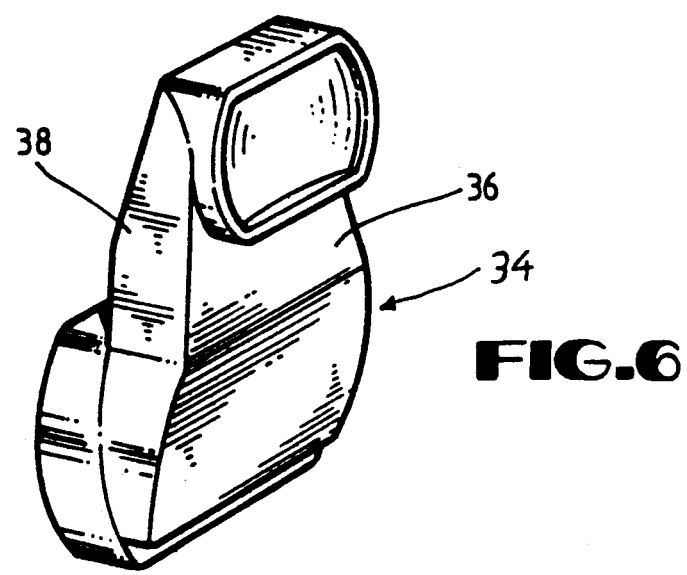
FIG. 6 illustrates the reading telescope of the present invention mounted within a housing which can be adhesively secured to the carrier lens of a pair of eyeglasses.

As shown in FIG. 6, a housing 34 can be provided to totally enclose the prism portion 13 of the reading telescope. In a preferred embodiment of the present invention, the housing is a two-piece unit of injection molded plastic comprised of a first member 36 and a second member 38. The two members 36 and 38 are held together with solvent or other glue. In alternative embodiments of the present invention, a tinted wafer or tinted carrier lens can be utilized to conceal the reading telescope 10 behind the carrier lens 12.

Although the invention has been described in conjunction with the foregoing specific embodiment, many alternatives, variations and modifications are apparent to those of ordinary skill in the art. Those alternatives, variations and modifications are intended to fall within the spirit and scope of the following claims.

I claim:

1. An apparatus for increasing visual acuity while viewing an image comprising:
   a) a parallelogram prism having two long parallel faces and two shorter parallel faces;
   b) an eyepiece lens mounted to an inward facing upper parallel face of the parallelogram prism near the upper apex of the parallelogram prism;
   c) an objective lens mounted to an outward facing long parallel face of the parallelogram prism near the lower apex of the parallelogram prism; and
   d) the prism, eye piece and objective lens mounted in the bifocal region of a carrier lens of a pair of eyeglasses with the objective lens being positioned at a location whereby a user wearing the eyeglasses can view an image received within the objective lens and reflected upward through the apparatus and out the eyepiece lens by rotating the eyes through a downward viewing angle relative to the visual axis of the user's eye while looking straight ahead.

2. The apparatus of claim 1 in which the inner surfaces of the two short parallel faces of the parallelogram prism are mirrored to provide more complete reflection of an image and to reduce diffused light reflections.

3. The apparatus of claim 1 in which the reflection from the inner surfaces of the two longer faces of the parallelogram prism is due to total internal reflection, said total internal reflection being achieved due to the large angle of incidence of the reflected image onto the two longer faces of the parallelogram prism.

4. The apparatus of claim 1 having adhesive material on the outward facing short face of the parallelogram prism to adhesively secure the apparatus to the bifocal region of a carrier lens of a pair of eyeglasses.

5. The apparatus of claim 1 in which the carrier lenses of the eyeglasses are tinted for concealing the apparatus.

6. The apparatus of claim 1 in which the eyepiece lens is a negative or concave lens and the objective lens is a positive or convex lens.

7. The apparatus of claim 1 wherein the parallelogram prism is enclosed within a housing.

8. The apparatus of claim 1 wherein the objective lens is received within a hole formed in the carrier lens of a pair of eyeglasses.

9. The apparatus of claim 1 wherein the objective lens, the eyepiece lens and the parallelogram prism are mounted entirely behind the back surface of the carrier lens of a pair of eyeglasses.

10. The apparatus of claim 1 wherein both the eyepiece lens and the objective lens are truncated vertically to provide a wide horizontal field of vision relative to the vertical field of vision.

11. The apparatus of claim 1 wherein the downward viewing angle is $22\frac{1}{2}$ degrees.

12. The apparatus of claim 1 wherein the downward viewing angle is within a range of about 17 degrees to about 27 degrees.

13. The apparatus of claim 1 wherein the eyepiece lens, parallelogram prism and the objective lens combination comprises a Galilean telescope in which the optical length of the reflected image is expanded to a length that exceeds the combined width of the prism and the thickness of the lenses by virtue of being internally reflected within the body of the parallelogram prism.

14. The apparatus of claim 1 in which a tinted wafer is mounted over the carrier lens of the eyeglasses for concealing the apparatus.

15. A method for constructing a variable focus reading telescope mounted completely behind the rear surface of a carrier lens of a pair of spectacles comprising:
   a) mounting a negative eyepiece lens within a threaded cylinder and mounting the cylinder to an inward facing vertical face of a parallelogram prism;
   b) attaching an objective lens to an outward facing vertical face of a parallelogram prism; and
   c) mounting the prism and eyepiece and objective lens combination in the bifocal region of a carrier lens of the spectacles by attaching adhesive to a forward facing face of the parallelogram prism and adhesively securing the combination to the rear surface of the carrier lens.

16. A method for enlarging the image of print or other reading material for view by a partially sighted person comprising:
   a) mounting a reading telescope on a carrier lens of a pair of eyeglasses such that the reading telescope does not protrude forward of the front surface of the carrier lens;
   b) positioning a lens at a lower apex of a parallelogram prism forming the body of the reading telescope;
   c) reflecting light received from an image within the reading telescope upward through the prism by four internal reflections and out an eyepiece lens to the eye of the person wearing the spectacles;
   d) magnifying the image;
   e) rotating the eye downward with respect to a straight ahead gaze so that the visual axis of the eye coincides with the optical axis of a reading telescope positioned between the carrier lens in a pair of spectacles and the person's eye wearing the spectacles; and f) viewing the image.

17. The method of claim 16 wherein the eye is rotated downward through an approximate 22½ degree angle.

18. The method of claim 16 wherein the image is magnified by from about 2.5 to about 4.5 times.

19. The method of claim 16 wherein the eye is rotated downward without movement of the person's head.

* * * * *

UNITED STATES PATENT AND TRADEMARK OFFICE
CERTIFICATE OF CORRECTION

PATENT NO. : 5,028,127
DATED : July 2, 1991
INVENTOR(S) : Larry A. Spitzberg

It is certified that error appears in the above—identified patent and that said Letters Patent is hereby corrected as shown below:

Column 7, line 42, please delete "upper" and insert -- long --.

Signed and Sealed this

Thirteenth Day of October, 1992

*Attest:*

DOUGLAS B. COMER

*Attesting Officer*      *Acting Commissioner of Patents and Trademarks*